United States Patent [19]

Senuma et al.

[11] Patent Number: 5,150,217
[45] Date of Patent: Sep. 22, 1992

[54] METHOD AND APPARATUS FOR AUTOFOCUS CONTROL USING LARGE AND SMALL IMAGE CONTRAST DATA

[75] Inventors: Satoko Senuma; Masaaki Tsuruta, both of Tokyo, Japan

[73] Assignee: Sony Corporation, Tokyo, Japan

[21] Appl. No.: 662,458

[22] Filed: Feb. 28, 1991

[30] Foreign Application Priority Data

Mar. 6, 1990 [JP] Japan .................................. 2-54420

[51] Int. Cl.⁵ .......................................... H04N 5/232
[52] U.S. Cl. .................................... 358/227; 358/226; 358/209; 250/201.7; 354/402
[58] Field of Search ........................ 358/227, 226, 209; 354/402, 406, 407, 408; 250/201.2, 201.7

[56] References Cited

U.S. PATENT DOCUMENTS 4,542,289  9/1985  Yokoyama et al. ............... 250/201
4,804,831  2/1989  Baba et al. ......................... 250/201
4,851,657  6/1989  Taniguchi et al. ................. 250/201
4,922,346  5/1990  Hidaka et al. ..................... 358/227
5,003,339  9/1991  Kikuchi et al. .................... 354/402

Primary Examiner—Michael Razavi
Assistant Examiner—Tuan V. Ho
Attorney, Agent, or Firm—Lewis H. Eslinger; Jay H. Maioli

[57] ABSTRACT

A video camera system has a movable focusing lens which is automatically focused to form a sharp subject image on a CCD. The CCD generates a video signal based on light from a subject transmitted through the movable focusing lens. Contrast data are produced from smaller and larger image frames in a field on the CCD based on the generated video signal. The movable focusing lens is controlled on the basis of the contrast data in order to maximize the contrast data simultaneously within the smaller and larger image frames.

6 Claims, 5 Drawing Sheets

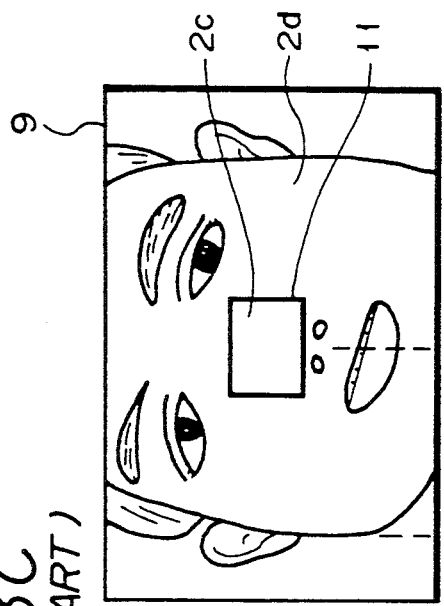
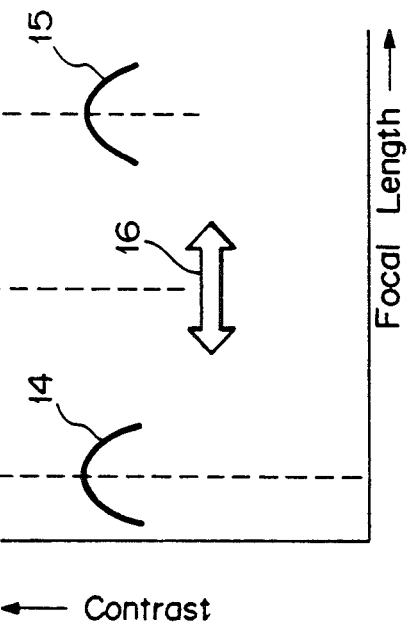
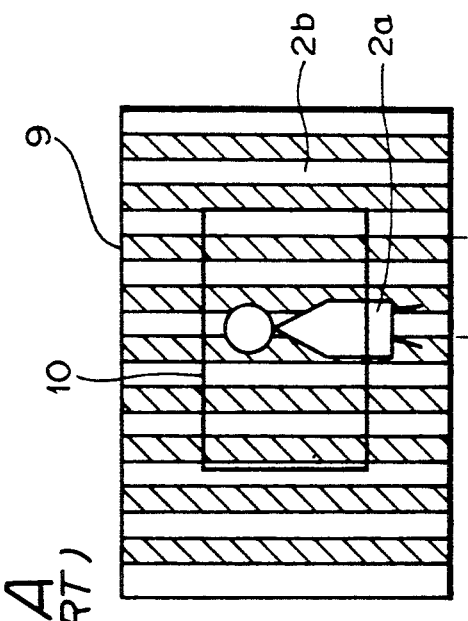
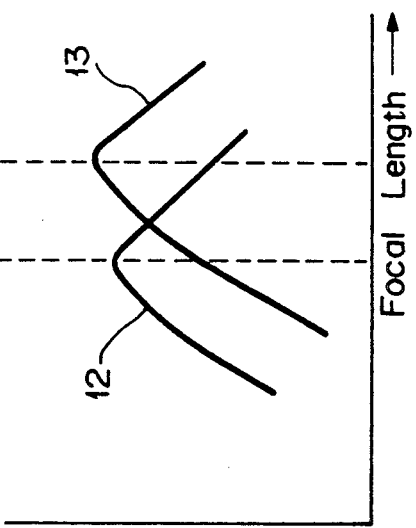

METHOD AND APPARATUS FOR AUTOFOCUS CONTROL USING LARGE AND SMALL IMAGE CONTRAST DATA

BACKGROUND OF THE INVENTION

1. Field of the Invention

The present invention relates to a device and method for automatic focusing control for a video camera system or the like.

2. Description of the Prior Art

Various automatic focusing mechanisms and methods have been proposed for use with imaging systems such as video camera systems. One general automatic focusing mechanism is known as a TTL (Through The Lens) system in which a video signal generated by an imaging device such as a CCD (charge-coupled device) or the like is processed by a microcomputer to measure the sharpness of the image on the CCD, and a lens combined with the imaging device is moved on the basis of the measured sharpness until the image is sharply focused on the CCD.

There are two typical automatic focusing variations based on the TTL principle, depending on how optical information from the subject to be imaged is produced. The first automatic focusing scheme is of a passive nature in that information borne by light coming from the subject and entering a master lens is used directly as automatic focusing information. The second automatic focusing configuration is of an active nature in that a light signal is radiated from the video camera system to the subject and information borne by light reflected by the subject is used as automatic focusing information. The active and passive automatic focusing variations operate mostly on the triangulation principles.

Recently, however, a passive automatic focusing process which utilizes the detected contrast of an image for focusing the image has become widely used. The conventional passive automatic focusing process of this type will be described below with reference to FIGS. 1A through 1D, 2, and 3A through 3D of the accompanying drawings.

When the image of a subject 2 formed in a viewfinder 1 of a video camera is focused and hence can clearly be seen by the user of the video camera, as shown in FIG. 1A, a video signal 3 produced by the imaging device of the video camera and passed through a filter has a high contrast formed of high frequency components, as shown by the steep slopes in the waveform of FIG. 1B. When the image of the subject 2 is defocused, as shown in FIG. 1C, the video signal 3 has a low contrast formed of low frequency components, as shown by the gradual curves in the waveform of FIG. 1D. The passive automatic focusing process is based on this principle. The video camera has a zoom lens assembly composed of a focusing lens, a zoom lens, and a master lens. For the detection of the contrast of the image, the focusing lens, indicated at 6 in FIG. 2, is moved a small distance by an automatic focusing (AF) motor 5 which is energized by an AF control circuit 8 that is supplied with a signal to reach a maximum contrast of the video signal 3 which represents the image of the subject 2 formed on a CCD 7.

In order to detect a maximum contrast level on the CCD 7 or a viewfinder field 9, as shown in FIG. 3A, there is established a relatively large image frame 10 substantially centrally located in the viewfinder field 9, the image frame 10 having a size of H/2×V/2 (H represents the horizontal dimension of the viewfinder field 9 and V the vertical dimension of the viewfinder field 97. When the image of a subject which is highest in contrast, e.g., a person 2a, within the image frame 10 is focused, contrast data are produced as indicated by a curve 12 in FIG. 3B. If a striped wall 2b, for example, is present in the background behind the person 2a, as shown in FIG. 3A, however, the focus is shifted to the wall 2b and the lens is focused on the background, as indicated by a curve 13 in FIG. 3B.

One solution is to use a smaller image frame 11 (FIG. 3C) within the viewfinder field 9 for focusing the person 2a sharply regardless of the background behind the person 2a. However, when the face 2d of a person is imaged for a close-up, as shown in FIG. 3C, the image frame 11 is positioned on the nose 2c. Since the nose 2c is viewed as a virtually flat image and produces no contrast, no focusing position can be found in the image frame 11. Nor can a focusing position be established when the subject moves as indicated by the arrow 16 in FIG. 3D.

Generally, the image frame to be established for contrast detection in the viewfinder field should be of a compromising size between large and small. With such image frame, however the lens may be focused on the background rather than the subject or the focusing position cannot be located, depending on the subject imaged in the viewfinder field 9.

OBJECTS AND SUMMARY OF THE INVENTION

In view of the aforesaid shortcomings of the conventional automatic focusing control processes, it is an object of the present invention to provide a method of automatic focusing control for a video camera system or the like for effectively focusing an image of the subject rather than the background behind the subject.

Another object of the present invention is to provide an automatic focusing control device for carrying out the above method.

According to the present invention, there is provided a device for automatic focusing control, comprising a movable focusing lens, imaging means for producing a video signal based on light transmitted from a subject through the movable focusing lens, means for producing contrast data from smaller and larger image frames in a field on the imaging means based on the video signal, and control means for controlling the movable focusing lens based on the contrast data in order to maximize the contrast data simultaneously within the smaller and larger image frames.

According to the present invention, there is also provided a method of automatic focusing control, comprising the steps of producing a video signal based on light transmitted from a subject through a movable focusing lens, producing contrast data from smaller and larger image frames in a field based on the video signal, and controlling the movable focusing lens based on the contrast data in order to maximize the contrast data simultaneously within the smaller and larger image frames.

The above and other objects, features, and advantages of the present invention will become apparent from the following detailed description of an illustrative embodiment thereof to be read in conjunction with the accompanying drawings, in which like reference numerals represent the same or similar objects.

BRIEF DESCRIPTION OF THE DRAWINGS

FIGS. 3A through 3D are diagrams showing a conventional automatic focusing control process;

DETAILED DESCRIPTION OF THE PREFERRED EMBODIMENT

Figure 4:
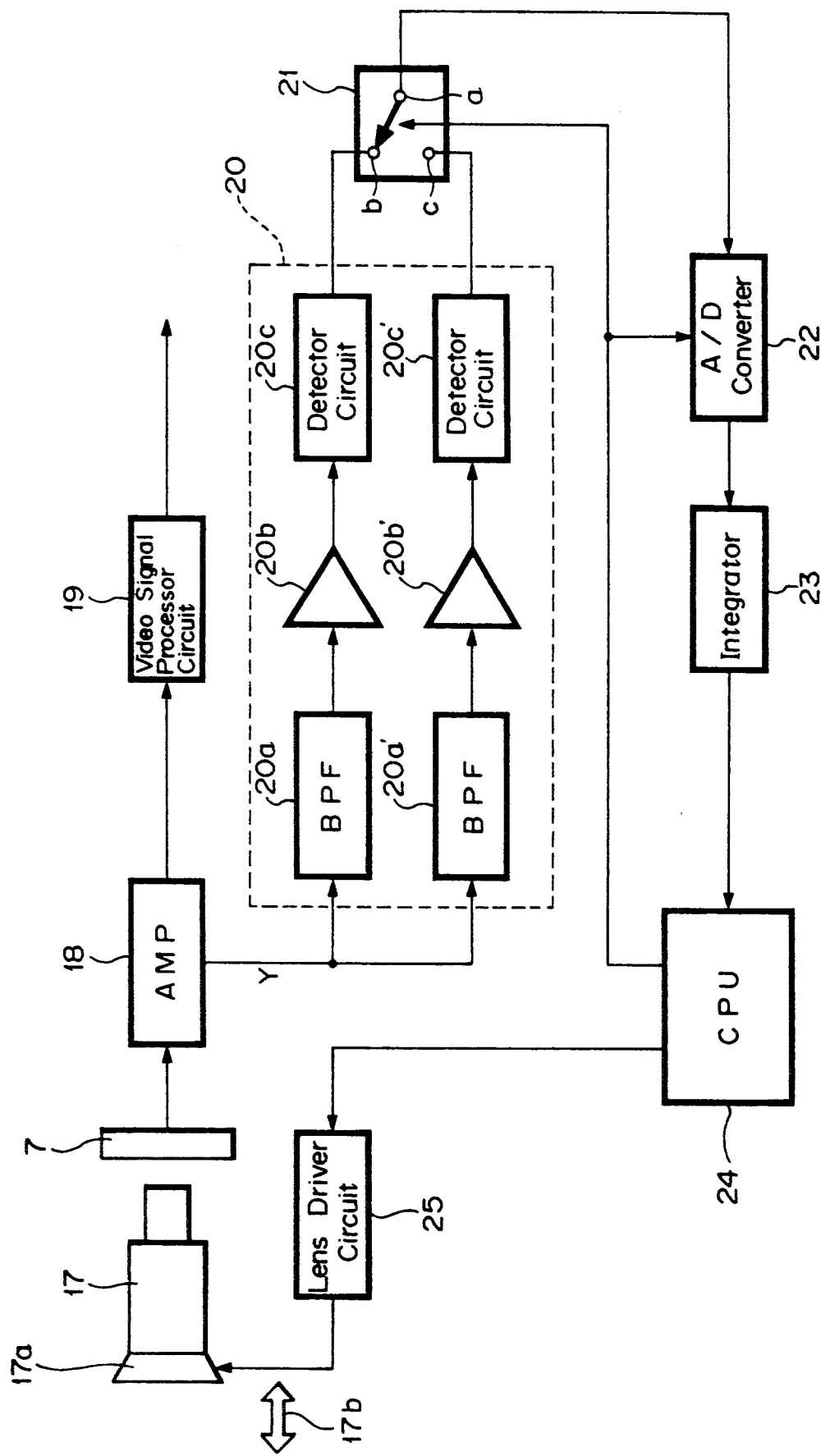
FIG. 4 is a block diagram of a device for automatic focusing control according to the present invention.

FIG. 4 shows in block form a device for automatic focusing control according to the present invention.

Figure 1A:
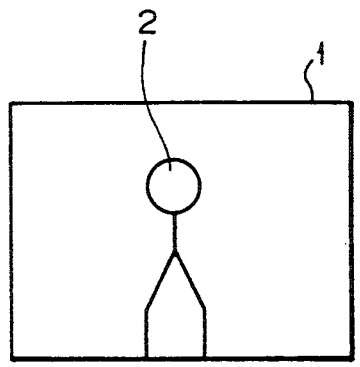
FIGS. 1A through 1D are diagrams illustrative of the principles of a conventional automatic focusing control process which utilizes the detected contrast of an image.
Figure 1C:
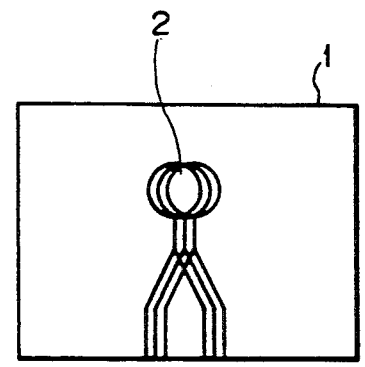
Figure 1B:
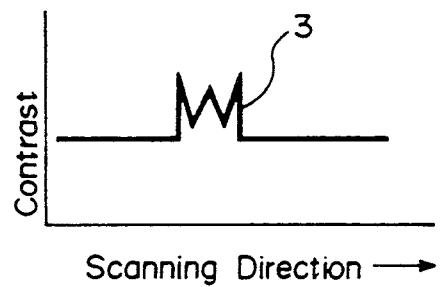
Figure 1D:
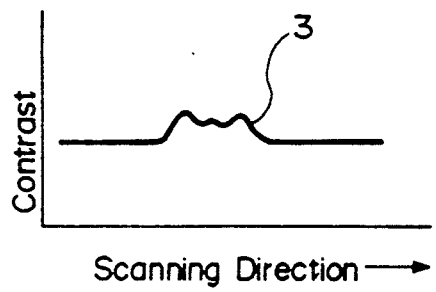
Figure 2:
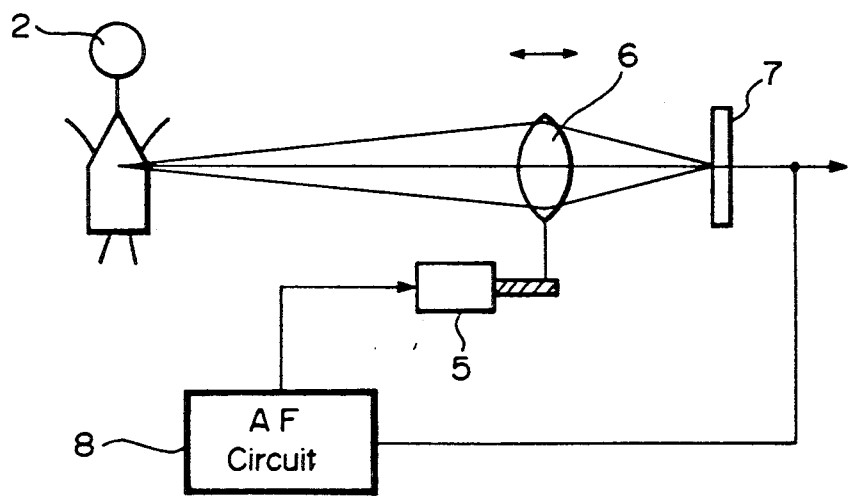
FIG. 2 is a diagram of an arrangement for carrying out the automatic focusing control process shown in FIGS. 1A through 1D.

As shown in FIG. 4, a video camera system or the like includes an imaging device 17 including a lens assembly composed of a focusing lens 17a, a zoom lens, and a master lens, (not shown) and a CCD image 7. The imaging device 17 also includes an automatic focus AF motor (shown in FIG. 2) which can be driven by a drive signal from a lens driver 25 for moving the focusing lens 17a over a small distance in a direction indicated by the arrow 17b. Instead of the focusing lens 17a, the master lens may be moved as an inner focusing lens.

Figure 6A:
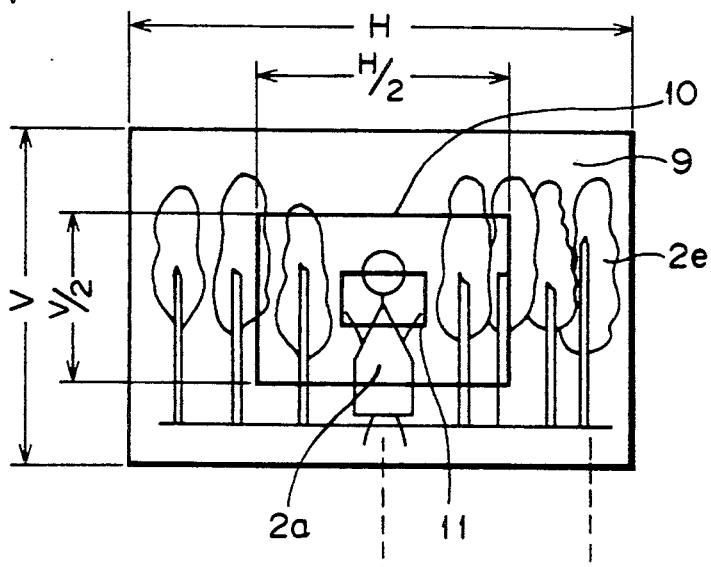
FIGS. 6A through 6C are diagrams showing the manner in which an image is focused according to the present invention.

As shown in FIG. 6A, the CCD 7 has a field 9 which includes larger and smaller image frames 10, 11 from which image data can be produced. The larger image frame 10 has a size of about $H/2 \times V/2$, and the smaller image frame 11 is positioned within the larger image frame 10. Light from a subject to be imaged is transmitted through the lens assembly and applied to the CCD 7. A video signal generated by the CCD 7 is supplied through an amplifier 18 FIG. 4 to a video signal processor 19 which in turn supplies a processed video signal to a video recording circuit (not shown). The amplifier 18 separates a luminance signal (hereinafter referred to as a "Y signal") from the video signal. The Y signal is supplied to a contrast detector 20 which detects the contrast of an image. In the contrast detector 20, Y signals generated from the respective larger and smaller image frames 10, 11 are passed through bandpass filters (BPF) 20a, 20a', respectively, and then amplified by respective amplifiers 20b, 20b'. Then, the amplified Y signals are applied to respective detectors 20c, 20c' which detect the contrast data from the larger and smaller image frames 10, 11. The contrast data from the larger and smaller image frames 10, 11 are supplied through a gate 21 to an analog-to-digital (hereinafter referred to as an "A/D") converter 22, which converts the supplied contrast data into digital contrast data. The digital contrast data are then supplied to an integrator 23 which integrates the data per field. The integrated data are supplied to a CPU (central processing unit) 24. The CPU 24 controls the gate 21 to multiplex the contrast data from the contrast detector 20 at high speed based on the vertical synchronizing signal so that the contrast data from the larger and smaller image frames 10, 11 are supplied to the CPU 24 substantially at the same time. Based on the integrated data from the integrator 23, the CPU 24 detects a maximum contrast of the image on the CCD 7, and applies a control signal, which indicates whether the AF motor is to be energized or not, the direction in which the focusing lens 17a is to be rotated, and the speed at which the focusing lens 17a is to be rotated, to the lens driver 25 to move the focusing lens 17a.

The device which is constructed as shown in FIG. 4 operates as follows: In the illustrated embodiment, the contrast of the image in the larger image frame 10 and the smaller image frame 1 are simultaneously detected. The contrast detector 20 is shown as having two sets of components, i.e., the BPFs 20a, 20a', the amplifiers 20b, 20b', and the detectors 20c, 20c' for simultaneous detection of contrasts in the image frames 10, 11. However in an alternate embodiment, the contrast detector 20 may have only one set of components formed as a BPF, an amplifier, and a detector, and the scanning of the CCD 7 may be controlled by the CPU 24 such that the larger image area 10 is first scanned and then the smaller image area 11 is scanned.

The gate 21 has a movable output contact a connected to the A/D converter 22 and two fixed input contacts b, c connected respectively to the detectors 20c, 20c'. The movable contact a is controlled by the CPU 24. First, the CPU 24 shifts the movable contact a into contact with the fixed contact b for the detection of the contrast in the larger image frame 10. With the conventional automatic focusing process, when the detected contrast is of a value short of a peak level corresponding to a focused condition, the AF motor is rotated in a direction to cause the contrast to reach the peak level. According to the present invention, while the AF motor is being rotated in the direction to cause the contrast to reach the peak level, the CPU 24 shifts the movable contact a of switch 21 into contact with the fixed contact c to detect contrast data from the smaller image frame 11 substantially at the same time as the contrast data from the larger image frame 10, and confirms a peak contrast level in the smaller image frame 11.

Figure 6B:
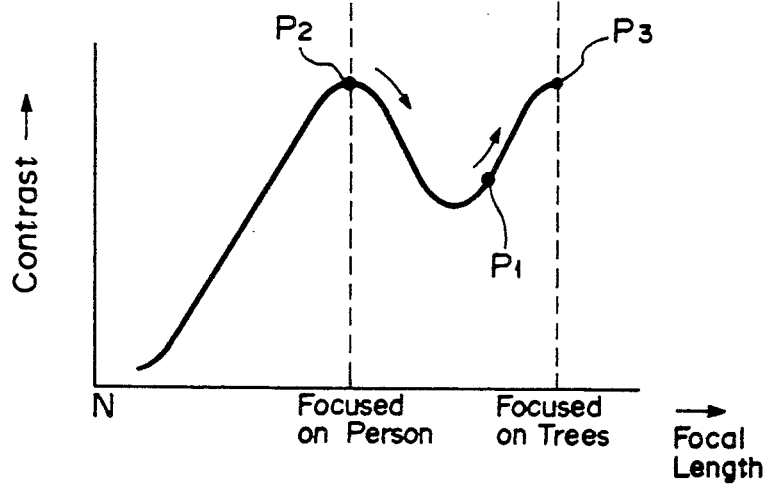
Figure 6C:
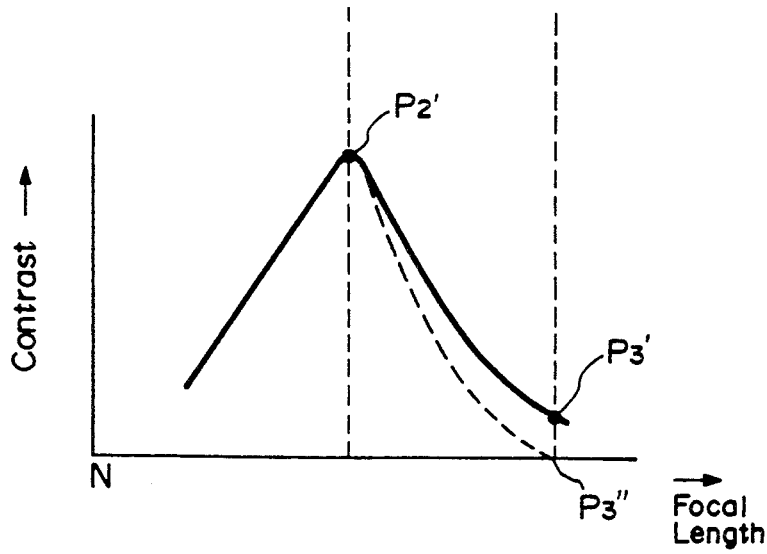

More specifically, the detected contrast data of the image in the larger image frame 10 as shown in FIG. 6A, are plotted in FIG. 6B. The contrast of a person 2a in FIG. 6A whose image is formed in a CCD field 9 would have a peak level P2. If the present focal length of the focusing lens 17a represents a contrast value P1 in FIG. 6B, then the AF motor is rotated in a direction to move the focusing lens 17a to increase the contrast up to a peak level P3, until the focusing lens 17a is focused on trees 2e in the background. During this operation, the CPU 24 confirms a peak contrast level P2' in the smaller image frame 11, as shown in FIG. 6C, and controls the AF motor again to move the focusing lens 17a until the peak contrast level P2' in the smaller image frame 11 is reached. The peak contrast level P2' in the smaller image frame 11 is the same as the peak contrast level P2 in the larger image frame 10, and these peak contrast levels P2', P2 indicate a common focused position, because they both relate to the same object, the person 2a in front of the tree 2e. The focusing lens 17a and hence its focusing ring are now stopped.

Figure 5:
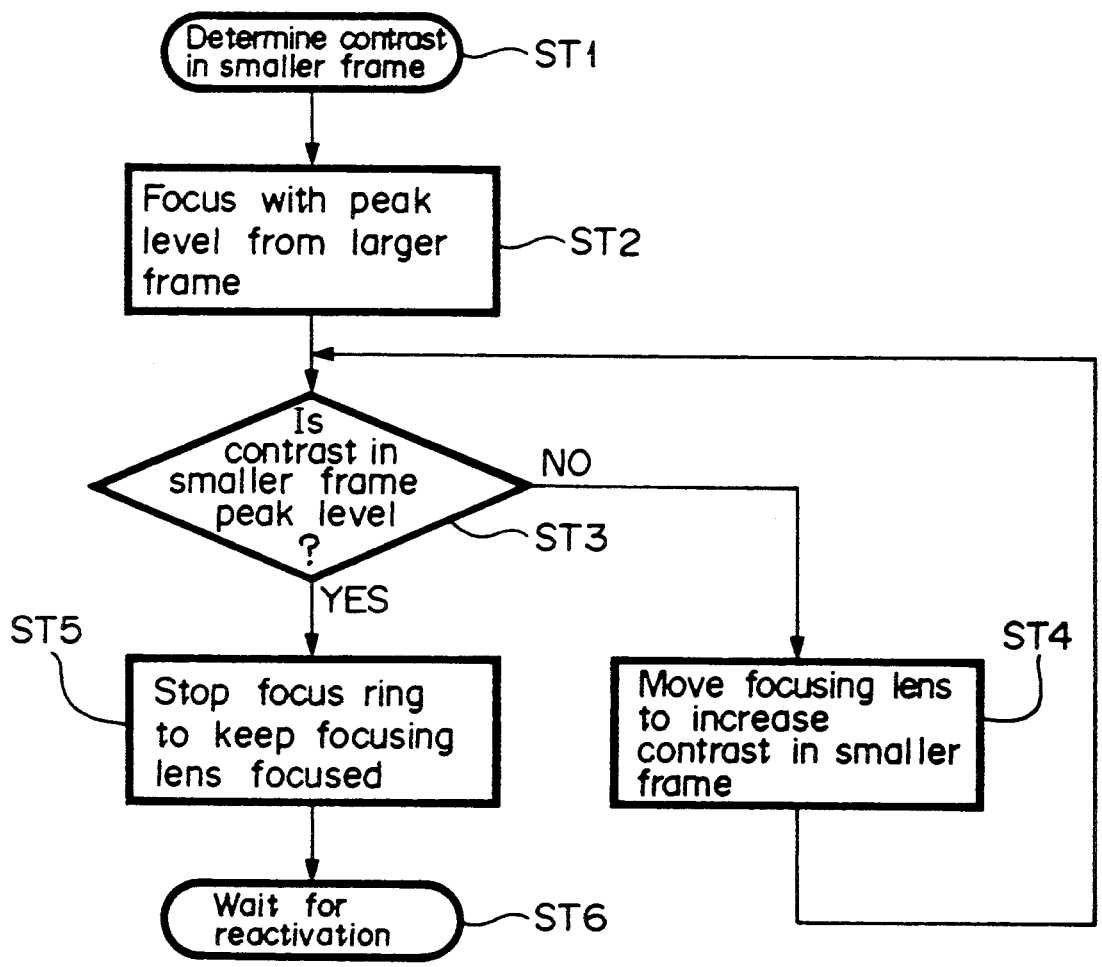
FIG. 5 is a flowchart of a method of automatic focusing control according to the present invention.

The method of automatic focusing control will be described below with reference to FIG. 5.

While the contrast is being increased from the value P1 to the peak level P3, the CPU 24 determines the contrast in the smaller image frame 11 in a step ST1. Then, the focusing lens 17a is focused and stopped with the peak level P3 from the larger image frame 10 in a step ST2. The CPU 24 determines in a step ST3 whether the contrast in the smaller image frame 11 is of the peak level P2' or not. Inasmuch as the contrast value P3' in the smaller image frame 11 at this time is not of the peak level P2' as shown in FIG. 6C, control goes to a step ST4 in which the AF motor is rotated to move the focusing lens 17a in a direction to increase the contrast in the smaller image frame 11. Then, control goes back to the step ST3 to determine whether the contrast in the smaller image frame 11 is of the peak level or not. The AF motor is rotated until the contrast in the smaller image frame 11 reaches the peak level P2' in the step ST3. If the contrast in the smaller image frame 11 reaches the peak level P2' in the step ST3, control goes from the step ST3 to a step ST5 in which the focus ring is stopped to keep the focusing lens 17a focused in the smaller image frame 11. Thereafter, the device for automatic focusing control waits for being activated again in a step ST6.

The focusing lens 17a is therefore prevented from being focused on the background, and is effectively focused on the desired subject 2a.

The bandpass filters 20a, 20a' of the contrast detector 20 may be modified to change the steepness of the characteristic curves thereof. More specifically, depending on the subject, the contrast from the smaller image frame 11 may be of a zero value and remain unchanged, as indicated at P3" in FIG. 6C, irrespective of the focal length of the lens assembly. At this time, the focusing lens 17a cannot be focused on the image in the smaller image frame 11. The frequency characteristics of the bandpass filters 20a, 20a' may be changed from the broken-line curve to the solid-line curve as shown in FIG. 6C for focusing the focusing lens 17a on the image in the smaller image frame 11.

With the arrangement of the present invention, the focusing lens is prevented from being focused on the background, and can be focused in a stable manner even if the video camera wobbles or the subject moves.

Although a certain preferred embodiment has been shown and described, it should be understood that many changes and modifications may be made therein without departing from the scope of the appended claims.

We claim as our invention:

1. A device for automatic focusing control, comprising:
   a movable focusing lens;
   imaging means for producing a video signal based on light from a subject transmitted through said movable focusing lens;
   means for producing contrast data from the video signal of a small image frame located within a large image frame and of the large image frame in a field on said imaging means; and
   control means for controlling said movable focusing lens in response to the produced contrast data including means for obtaining contrast data from the small image frame when the contrast data from the large image frame are maximum, and means for controlling the movable focusing lens to maximize the contrast data from the small image frame.

2. A device according to claim 1, wherein said control means includes means for multiplexing the contrast data from the small image frame and the contrast data from the large image frame, and driver means for moving said movable focusing lens based on the multiplexed contrast data.

3. A device according to claim 1, wherein said control means includes means for controlling said movable focusing lens based on contrast data from the large image frame.

4. A method of automatic focusing control, comprising the steps of:
   producing a video signal based on light from a subject transmitted through a movable focusing lens;
   producing contrast data from a produced video signal of a small image frame located within a large image frame and from the large image frame, both in the same image field; and
   controlling said movable focusing lens based on produced contrast data including obtaining contrast data from the small image frame when the contrast data from the large image frame is a maximum, and controlling the movable focusing lens in order to maximize the contrast data from the small image frame.

5. A method according to claim 4, wherein said controlling said movable focusing lens comprises multiplexing contrast data from the small image frame and contrast data from the large image frame, and controlling said movable focusing lens based on the multiplexing contrast data.

6. A method according to claim 4, wherein said controlling said movable focusing lens comprises controlling said movable focusing lens based on contrast data from the large image frame.

* * * * *